US008175807B2

(12) United States Patent
Suarez-Rivera et al.

(10) Patent No.: US 8,175,807 B2
(45) Date of Patent: May 8, 2012

(54) ESTIMATING HORIZONTAL STRESS FROM THREE-DIMENSIONAL ANISOTROPY

(75) Inventors: Roberto Suarez-Rivera, Salt Lake City, UT (US); Tom R. Bratton, Littleton, CO (US)

(73) Assignee: Schlumberger Technology Corporation, Sugar Land, TX (US)

( * ) Notice: Subject to any disclaimer, the term of this patent is extended or adjusted under 35 U.S.C. 154(b) by 577 days.

(21) Appl. No.: 12/363,257

(22) Filed: Jan. 30, 2009

(65) Prior Publication Data

US 2009/0210160 A1 Aug. 20, 2009

Related U.S. Application Data

(60) Provisional application No. 61/030,192, filed on Feb. 20, 2008.

(51) Int. Cl.
*G01V 1/40* (2006.01)
*G01V 9/00* (2006.01)
(52) U.S. Cl. .............................................. 702/11; 702/6
(58) Field of Classification Search ................. 702/6, 11
See application file for complete search history.

(56) References Cited

U.S. PATENT DOCUMENTS

| 5,398,215 | A | 3/1995 | Sinha et al. | |
|---|---|---|---|---|
| 6,098,021 | A | 8/2000 | Tang | |
| 6,614,716 | B2 | 9/2003 | Plona et al. | |
| 6,714,480 | B2 | 3/2004 | Sinha et al. | |
| 6,920,082 | B2 | 7/2005 | Tang | |
| 2003/0167835 | A1* | 9/2003 | Sinha et al. | 73/152.16 |
| 2005/0171751 | A1* | 8/2005 | Siebrits et al. | 703/10 |

FOREIGN PATENT DOCUMENTS

GB 2288236 10/1995

OTHER PUBLICATIONS

Thiercelin M. J. and Plumb, R. A., Core-Based Prediction of Lithologic Stress Contrasts in East Texas Formations, SPE Formation Evaluation, SPE 21847, Dec. 1994, pp. 251-258 (8 pages).
Schoenberg, M. et al., Introducing Annie: A Simple Three-Parameter Anisotropic Velocity Model for Shales, Journal of Seismic Exploration, 1996, pp. 35-49 (16 pages).

* cited by examiner

*Primary Examiner* — Mohamed Charioui
*Assistant Examiner* — Manuel Rivera Vargas
(74) *Attorney, Agent, or Firm* — Colin L. Wier (57) ABSTRACT

A method for determining properties of a subterranean formation. The method includes determining at least one characterization parameter based on wave velocity measurement data, determining a plurality of elastic coefficients based on the at least one characterization parameter using a plurality of equations, determining an anisotropic stress profile of the subterranean formations based on the stiffness matrix of the subterranean formation comprising the plurality of elastic coefficients wherein the elastic coefficients are approximated using the plurality of equations, and displaying the anisotropic stress profile of the subterranean formations.

14 Claims, 6 Drawing Sheets

ESTIMATING HORIZONTAL STRESS FROM THREE-DIMENSIONAL ANISOTROPY

CROSS REFERENCE TO RELATED APPLICATIONS

This application claims priority under 35 U.S.C. §119(e) from Provisional Patent Application No. 61/030,192 filed Feb. 20, 2008, entitled "Method and Apparatus for Flow Rate Estimate Using Well Models And Gas Lift Optimization", which is hereby incorporated by reference in its entirety.

BACKGROUND

Materials exhibiting different properties along different locations within their body are called heterogeneous. Their heterogeneity may be random or organized. Layered media are examples of materials with organized heterogeneity that exhibit similar properties within a bed plane and different properties perpendicular to the bed plane. These types of materials may be modeled by assuming rotational symmetry in material properties, with an axis of rotation perpendicular to bedding. Because of the laminated structure (which may be fine-scale, as in shales, or large-scale, as in reservoir interbeds) their stress-strain relationships change with orientation to bedding. In general, laminated materials tend to be stiffer along the direction parallel to bedding and more compliant along the direction perpendicular to bedding. Correspondingly, propagating sound waves (compressional and shear) in these materials result in wave velocities that are higher parallel to bedding and lower perpendicular to bedding. The theory of elastic anisotropy describes this behavior. By defining material properties along principal directions of material symmetry, it provides a methodology for predicting material behavior under any conditions of applied loading and deformation.

Geologic materials are complex and often exhibit various types of heterogeneity (e.g., fine-scale texture superposed to the presence of fracture sets and as part of a larger scale structure). Furthermore, the layering may not be ideal (e.g., some beds may have different orientations or be discontinuous). The resulting stress-strain behavior may or may not be well represented by the elastic anisotropic theory, and may change with scale (from sample-scale to log-scale). Furthermore, their stress-strain behavior may not be elastic (e.g., plastic shales).

There are three basic types of formations: formations that have identical elastic properties in all three spatial directions are called isotropic, formations that have identical elastic properties in two directions but a different property in the third direction are called transverse isotropic (TI), and formations that have different properties in all three dimensions are called orthotropic. There are two independent moduli that characterize isotropic formations, five independent moduli that characterize TI formations and nine independent moduli that characterize orthorhombic formations. The aforementioned types of isotropic formations may be modeled using isotropic earth models. For example, to model a TI formation, the five moduli associated with TI formations may be determined by a combination of measurements and assumptions. For example, the Sonic Scanner® downhole tool from Schlumberger may be used to measure three of the five moduli and two other may be determined by assumption.

Further, an ANNIE approximation may be used to approximate the two non-measured moduli. The ANNIE approximation is generally used in the seismic community to represent the behavior of laminated media (e.g., shale). The five parameters that are used to describe a TI material are C11, C13, C33, C44, and C66 where each $C_{ij}$ is an elastic coefficient in a stiffness matrix relating stress to strain of the subterranean formations. The parameter C12 is not an independent variable but may be determined by the following equation: C12=C11−2*C66 due to the symmetry of a TI formation. The Sonic Scanner® may be used to measure C33, C44, and C66. The two parameters C11 and C13 may be determined some other way, such as using the ANNIE approximation. Using the above measurements and approximations, an earth model for the TI formation may be generated.

SUMMARY

In general, in one aspect, the invention relates to a method for determining properties of a subterranean formation. The method includes determining at least one characterization parameter based on wave velocity measurement data, determining a plurality of elastic coefficients based on the at least one characterization parameter using a plurality of equations, determining an anisotropic stress profile of the subterranean formations based on the stiffness matrix of the subterranean formation comprising the plurality of elastic coefficients wherein the elastic coefficients are approximated using the plurality of equations, and displaying the anisotropic stress profile of the subterranean formations.

Other aspects of the estimating horizontal stress from three-dimensional (3D) anisotropy will be apparent from the following description and the appended claims.

DETAILED DESCRIPTION

Embodiments of estimating horizontal stress from 3D anisotropy are depicted in the above-identified figures and described in detail below. In describing the embodiments, like or identical reference numerals are used to identify common or similar elements. The figures are not necessarily to scale and certain features and certain views of the figures may be depicted exaggerated in scale or in schematic in the interest of clarity and conciseness.

In general, embodiments of estimating horizontal stress from three-dimensional (3D) anisotropy relates to methods for determining properties of subterranean formations, which uses generalized relationships (e.g., equations E11 and E12 below) for stress and anisotropy parameters that may be simplified to the ANNIE approximation for specific formations. These generalized relationships for stress and anisotropy parameters represent, for example, gas shale formations more accurately. However, those skilled in the art will appreciate that one or more embodiments described herein may be applied to formations other than gas shale formations.

Briefly, according to the theory of elasticity, the elastic response of a body to an applied load may be obtained using the principle of energy conservation, whereby the applied stress causes deformations, which changes the strain energy within the body. Mathematically, the stress ($\tau$) at each point of a body is expressed as the change in strain energy associated to the change in the displacement gradient. This in turn, is proportional to the resulting strain. The resulting expressions (E1 and E2) correspond to the generalized Hooke's law (in tensorial notation), and indicate a proportional relationship between stress ($\tau_{ij}$) and strain ($\epsilon_{ij}$).

$$\tau_{ij} = C_{ijkl}\varepsilon_{kl} \quad (E1)$$

$$C_{ijkl} = \begin{bmatrix} C_{11} & C_{12} & C_{13} & C_{14} & C_{15} & \ldots \\ C_{21} & C_{22} & C_{23} & C_{24} & C_{25} & \ldots \\ C_{31} & C_{32} & C_{33} & C_{34} & C_{35} & \ldots \\ C_{41} & C_{42} & C_{43} & C_{44} & C_{45} & \ldots \\ C_{51} & C_{52} & C_{53} & C_{54} & C_{55} & \ldots \\ \ldots & \ldots & \ldots & \ldots & \ldots & \ldots \end{bmatrix} \quad (E2)$$

The coefficient of proportionality in (E1) and (E2) is the elastic-tensor or stiffness-tensor. For heterogeneous bodies, $C_{ijkl}$ is a function of the position in the body; for homogeneous bodies, $C_{ijkl}$ is a constant and independent of position. Mathematically $C_{ijkl}$ is a forth-order tensor that has $3^4=81$ independent components. However, symmetry properties and conditions of positive definiteness reduce the number of independent components to 21. The number of independent components of the tensor may be reduced further, depending on material symmetries. For orthotropic symmetry the material response is characterized by nine independent stiffness coefficients, namely, $C_{11}$, $C_{22}$, $C_{33}$, $C_{44}$, $C_{55}$, $C_{66}$, $C_{12}$, $C_{13}$, $C_{23}$. For transverse isotropic behavior (i.e., rotational symmetry) the material response is characterized by five independent material constants, namely, $C_{11}=C_{22}$, $C_{33}$, $C_{44}=C_{55}$, $C_{12}$, $C_{13}=C_{23}$; where $C_{66}$ is a function of the others. For isotropic symmetry, there is no directional bias. Accordingly, the material response for isotropic symmetry may be characterized with only two independent material constants ($C_{11}=C_{22}=C_{33}$, $C_{12}=C_{13}=C_{23}$; where $C_{44}=C_{55}=C_{66}$ are functions of the others).

Based on the aforementioned symmetries, the stiffness matrix for anisotropic materials with orthotropic symmetry may be expressed as follows:

$$C_{ijkl} = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix}, \quad (E3)$$

The five independent elastic coefficients of the transversely isotropic media are $C_{11}$, $C_{33}$, $C_{12}$, $C_{13}$, and $C_{44}$. Alternatively, these may be selected as follows, $C_{33}$, $C_{12}$, $C_{13}$, $C_{44}$, and $C_{66}$, because $C_{66}$ may be represented as a function of $C_{11}$ and $C_{12}$. Processing of Sonic Scanner logs from vertical wells provides three independent coefficients: $C_{33}$, $C_{44}=C_{55}$, and $C_{66}$. Consequently, two additional coefficients $C_{12}$ and $C_{13}$ remain to be determined for a complete characterization of material properties.

An ANNIE approximation is generally used in the seismic community to represent the behavior of laminated media (e.g., shale) with a reduced set of three elastic parameters. The ANNIE approximation is based on the assumption of two relationships between the other elastic properties described as:

$$C_{12}=C_{13} \quad (E4)$$

$$C_{13}=(C_{33}-2C_{44}) \quad (E5)$$

Following the ANNIE approximation, the values of $C_{11}$ and $C_{12}=C_{13}$ may be expressed as follows:

$$C_{12}=C_{13}=(C_{33}-2C_{44})=(C_{11}-2C_{66}) \quad (E6)$$

$$C_{11}=(C_{33}-2C_{44}+2C_{66}) \quad (E7)$$

With respect to the E4, laboratory data has shown that E4 is valid for thinly bedded formation such as gas shales. With respect to E5, $C_{13}$ may be determined using E5 or, alternatively, may be determined using one or more embodiments described below.

Figure 1:
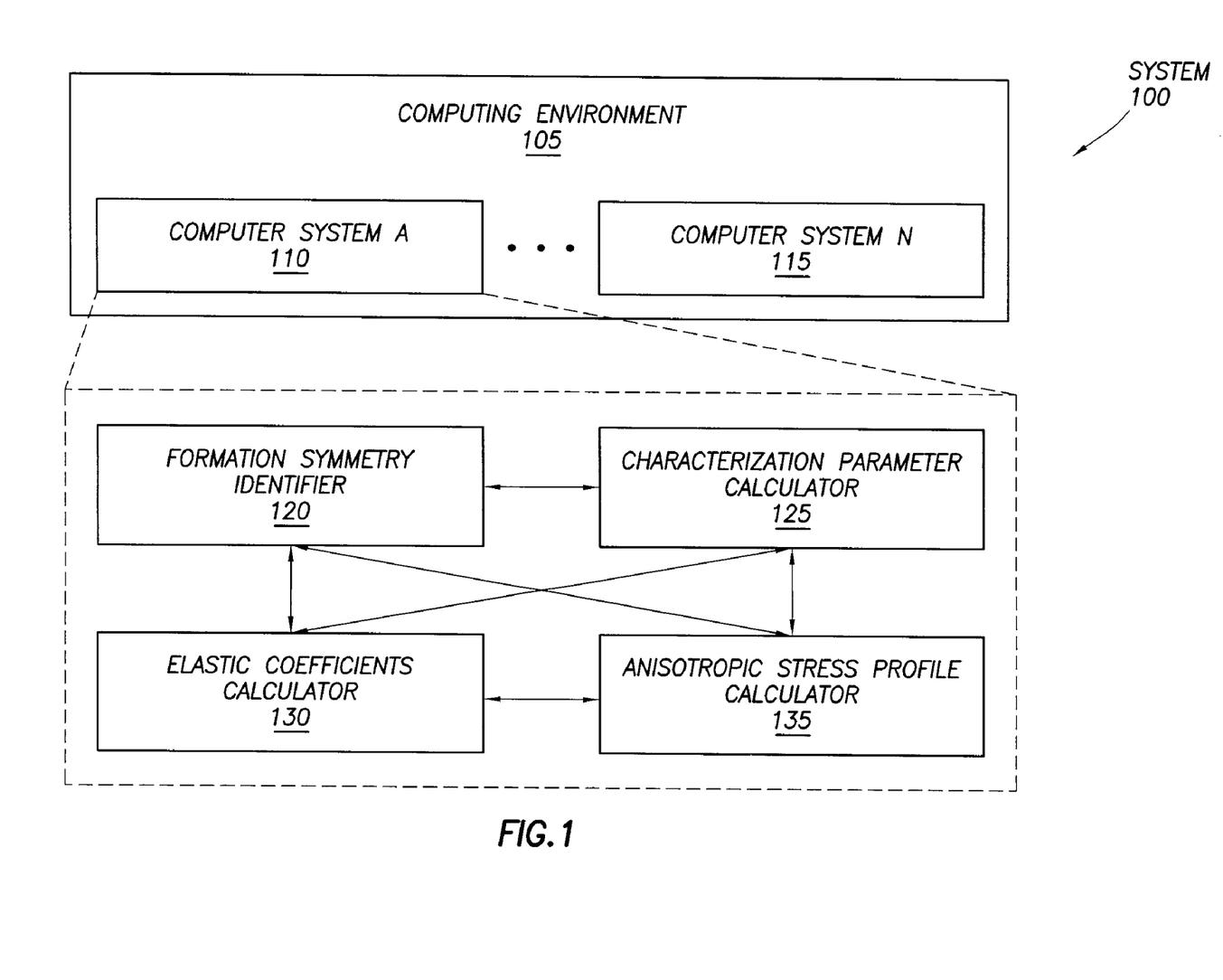
FIG. 1 is a schematic block diagram of a system in accordance with one or more embodiments.

FIG. 1 shows a diagram of a system in accordance with one or more embodiments of estimating horizontal stress from 3D anisotropy. Specifically, FIG. 1 shows a diagram of a computing environment (105) in accordance with one or more embodiments. In one or more embodiments, one or more of the modules shown in FIG. 1 may be omitted, repeated, and/or substituted. Accordingly, embodiments of estimating horizontal stress from 3D anisotropy should not be considered limited to the specific arrangements of modules shown in FIG. 1.

In one or more embodiments, the computing environment (105) may include one or more computer systems (e.g., computer system A (110), computer system N (115), etc.) configured to perform oilfield operations such as drilling-related tasks. In one or more embodiments of the invention, the computer system(s) (e.g., 110, 115) may be web servers, embedded systems (e.g., a computer located in a downhole tool), desktop computers, laptop computers, personal digital assistants, any other similar type of computer system, or any combination thereof.

Specifically, in one or more embodiments, one or more of the computer systems (e.g., 110, 115) may include a formation symmetry identifier (120), a characterization parameter calculator (125), an elastic coefficients calculator (130), and/or an anisotropic stress profile calculator (135). In one or more embodiments, the aforementioned components (i.e., 120, 125, 130, 135) may be located in a single computer system (e.g., 110, 115), distributed across multiple computer systems (e.g., 110, 115), or any combination thereof. In one or more embodiments, each of the aforementioned components (i.e., 120, 125, 130, 135) may include one or more software modules, one or more hardware modules, or any combination thereof. Further, in one or more embodiments, the aforementioned components (i.e., 120, 125, 130, 135) may be configured to communicate with each other via function calls, application program interfaces (APIs), a network protocol (i.e., a wired or wireless network protocol), electronic circuitry, any other similar type of communication and/or communication protocol, or any combination thereof.

In one or more embodiments, the formation symmetry identifier (120) may be configured to identify formation symmetry (e.g., isotropic, transverse isotropic (TI), or orthotropic) using reference data. Identifying formation symmetry using reference data is discussed below with respect to FIG. 2.

In one or more embodiments, the characterization parameter calculator (125) may be configured to calculate one or more characterization parameters in a set of equations for approximating elastic coefficients in a stiffness matrix associated with a TI formation using wave velocity measurement data. Calculating the characterization parameter is discussed below with respect to FIGS. 2-5.

In one or more embodiments, the elastic coefficients calculator (130) may be configured to calculate elastic coefficients using the characterization parameter and the set of equations for approximating elastic coefficients in a stiffness matrix. Calculating elastic coefficients is discussed below with respect to FIGS. 2-5.

In one or more embodiments of the invention, the anisotropic stress profile calculator (135) may be configured to calculate the anisotropic stress profile of the TI formation using the stiffness matrix calculated by the elastic coefficients calculator (120). Further, in one or more embodiments, calculating the anisotropic stress profile may involve using the characterization parameter(s) calculated by the characterization parameter calculator (125). Calculating the anisotropic stress profile is discussed below with respect to FIGS. 2-5.

Figure 2:
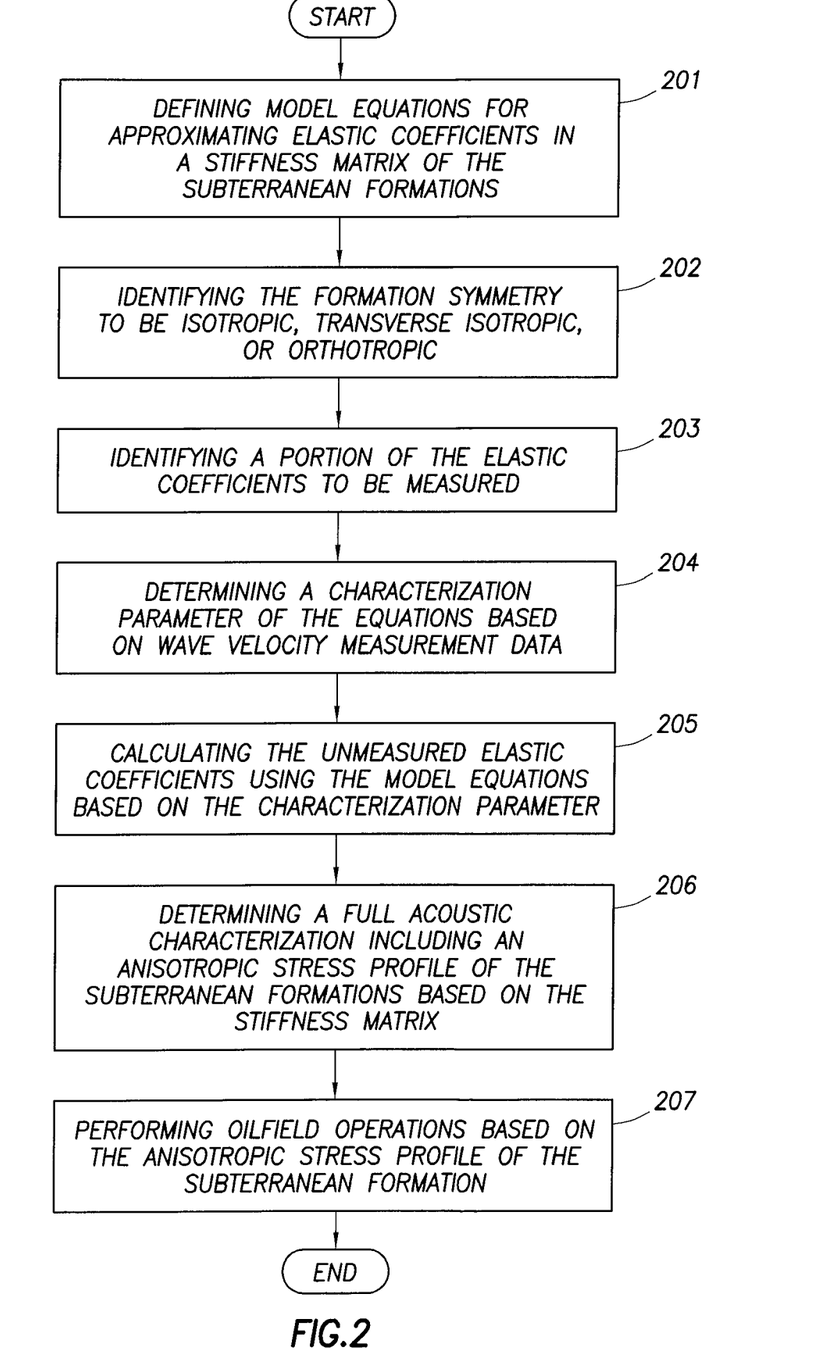
FIG. 2 is a flowchart depicting a method in accordance with one or more embodiments.

FIG. 2 is a flowchart depicting a method for determining properties of subterranean formations in accordance with embodiments of estimating horizontal stress from 3D anisotropy. The subterranean formations may include a transverse isotropic region. In one or more embodiments, one or more of the elements shown in FIG. 2 may be omitted, repeated, and/or performed in a different order. Accordingly, embodiments of estimating horizontal stress from 3D anisotropy should not be considered limited to the specific arrangements of elements shown in FIG. 2. The method as shown in FIG. 2 may be practiced using the system (100) described with respect to FIG. 1 above.

At 201, a set of equations are defined for approximating elastic coefficients in a stiffness matrix of the subterranean formations. The stiffness matrix may be a fourth-order tensor of the generalized Hook's law in tensorial notation. Embodiments of estimating horizontal stress from 3D anisotropy may use various sets of equations such as the one described below. The particular set of equations are defined depending on the symmetry of the subterranean formations, e.g., isotropic, transverse isotropic, or orthotropic. At 202, the symmetry of the formation may be determined by analyzing core samples, Sonic Scanner logs, or any other relevant data.

At 203, a portion of the elastic coefficients to be measured using wave velocity measurement techniques is identified based on the symmetry of the formation and the configuration of the well. Specifically, dispersion analysis is used to diagnose the source of anisotropy and exclude portions from the interpretation zones that are inappropriate for estimating horizontal stress from 3D anisotropy. More details of such techniques may be found in U.S. Pat. Nos. 5,398,215 and 6,614,716.

At 204, a characterization parameter ($\chi$) is determined based on wave velocity measurement data, for example, using statistical analysis. In one embodiment, the characterization parameter ($\chi$) is determined for $C_{13}=(C_{33}-\chi C_{44})$ as a modification of the ANNIE approximation, where $C_{13}$, $C_{33}$, and $C_{44}$ are elastic coefficients in the stiffness matrix. Other embodiments related to determining the characterization parameter ($\chi$) are described below.

At 205, the remaining unmeasured elastic coefficients in the stiffness matrix may be determined using the set of equations based on the characterization parameter ($\chi$). At 206, a full acoustic characterization including anisotropic distribution of stress (i.e., the anisotropic stress profile) of the subterranean formations may then be determined using the stiffness matrix. The anisotropic stress profile may be displayed or stored in a data repository. At 207, oilfield operations may be performed based on the anisotropic stress profile of the subterranean formation.

As described above, in one embodiment, the ANNIE approximation may be modified to use $$C_{13}=(C_{33}-\chi C_{44}) \quad (E8)$$

where $\chi$ is a characterization parameter determined from laboratory data collected from a transverse isotropic region of the subterranean formations. $\chi$ may vary with formation properties. Further, $\chi$ may be approximated using $C_{44}$ and $C_{66}$ along with a gain $a_1$ and offset $a_2$ as follows:

$$\chi = a_1*(C_{66}-C_{44})+a_2 \quad (E9)$$

The gain $a_1$ and offset $a_2$ may be calibrated with core data collected from the TI region or with a walkaway VSP (vertical array of seismic geophones).

Furthermore, additional parameterized approximation equations may be used as an alternative to the ANNIE approximation for determining the aforementioned five elastic moduli to properly characterize a TI formation. For example, using the following assumptions (1) $C_{11}=C_{33}*C_{66}/C_{44}$ and (2) $C_{12}=C_{13}$ along with another characterization parameter $\chi'$ (which takes into account discrepancies between the prediction from the equations and laboratory data), $C_{11}$ may then be determined as follows:

$$C_{11}=\chi'^{*}C_{33}*C_{66}/C_{44}+(1-\chi')*C_{33} \quad (E10)$$

In another embodiment, the ANNIE approximation may be modified to use $$C_{12}=\xi C_{13} \quad (E11)$$

$$C_{13}=\zeta C_{33}-2C_{44} \quad (E12)$$

Equations (E11) and (E12) result in $$C_{11} = \xi(\zeta C_{33} - 2C_{44}) + 2C_{66} \quad (E13)$$

$$K_o = \frac{\sigma_h}{\sigma_z} = \zeta - 2\frac{C_{44}}{C_{33}} \quad (E14)$$

where $\xi$, and $\zeta>1$ are the characterization parameters that may be evaluated by comparing the predicted results of (E11) and (E12) with measurements or correlations obtained from laboratory data on core or other log measurements. $K_o$ is defined as the ratio of the minimum horizontal stress to the vertical stress, which is known in the art as the coefficient of earth stress.

Furthermore, if a material is elastic, then the energy that goes into stressing the material is conserved; it is not destroyed; only stored. Upon relaxation, that energy is released. Since energy cannot be created or destroyed, certain relationships between the $C_{ij}$ parameters, such as Equations E15 thru E17 below, follow the conservation of energy. Energy considerations imply that $$\det = C_{44}^2 C_{66}(C_{11}-C_{12})(C_{33}(C_{11}+C_{12})-2C_{13}^2)>0 \quad (E15)$$

By combining equations (E11)-(15), the following expressions:

$$2C_{44}^2 C_{66}^2(2\xi C_{33}^2(\xi-\zeta)-8C_{44}^2-4C_{33}(\xi C_{44}-\zeta)+C_{66})>0 \quad (E16)$$

$$C_{44}>0, C_{66}>0, \text{ and } (2\zeta C_{33}^2(\xi-\zeta)-8C_{44}^2-4C_{33}(\xi C_{44}-\zeta)+C_{66})>0 \quad (E17)$$

Thus, these equations may be used as constraints for estimating horizontal stress from 3D anisotropy. For example, the estimation of unmeasured $C_{ij}$ parameters may be verified with respect to these constraints and be bounded using E15 thru E17.

In another embodiment, the Thomsen parameters γ and ε are assumed to be linearly related and the ANNIE approximation may be modified as follows:

$$C_{11} = AC_{33}\frac{C_{66}}{C_{44}} + B \quad (E18)$$

where A and B are the characterization parameters that may be evaluated from alternative measurements or correlations (obtained from laboratory data on core or other log measurements).

In another embodiment, the Thomsen parameters δ and ε are assumed to be linearly related and appropriate characterization parameters may be defined accordingly.

Those skilled in the art will appreciate that the use of TI moduli are not limited to the examples discussed above. For example, p-wave anisotropy may be predicted from the s-wave anisotropy and both the vertical and horizontal p-wave velocities may be used in 3D seismic analysis. In addition, existing isotropic velocity models may be supplemented with anisotropic measurements using the techniques described above and further with respect to FIGS. 3-5 below.

Furthermore, although the equations described above may be appropriate for TI with a vertical axis of symmetry. One skilled in the art with the benefit of this disclosure should be able to format the equations for TI with a horizontal axis of symmetry.

Examples of measurement data for the method of FIG. 2 using equation (E8) are described with respect to FIGS. 3-5 below. The following examples are not intended to limit the scope of the claims.

Figure 3:
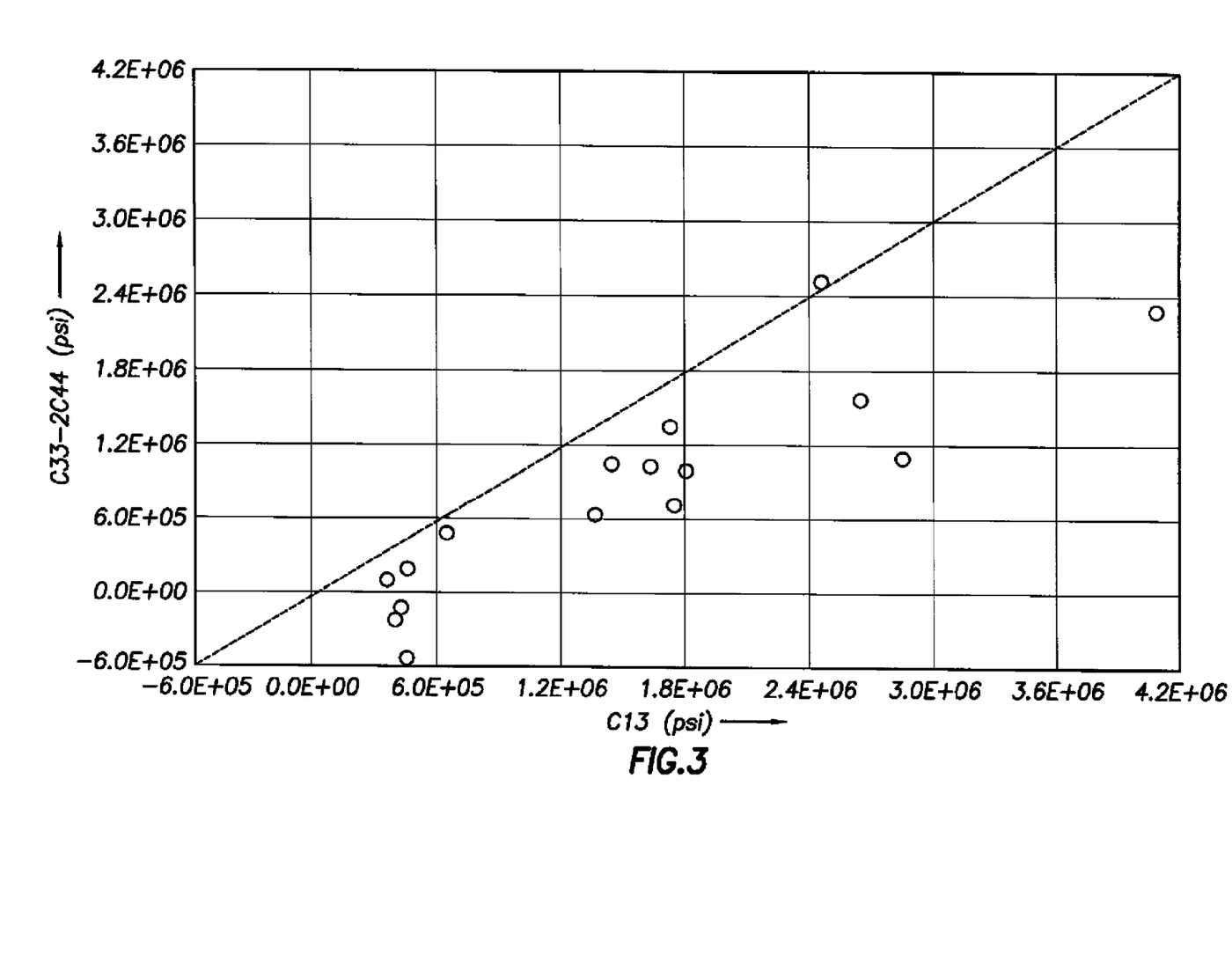
FIGS. 3-5 depict examples of measurement data for the method of FIG. 2 above.

Turning to the examples, FIG. 3 shows the results of an ANNIE approximation using $C_{13}=(C_{33}-2C_{44})$ as compared with laboratory data for a gas shale formation.

Using an alternative formulation of the ANNIE approximation given by $$C_{13}=(C_{33}-\chi C_{44}) \quad (E8)$$

in addition, comparing prediction from this equation to measured data, the mean value of χ may be evaluated for satisfying empirical data in the literature. FIG. 4 shows example values of χ for sandstone, shale, and gas shale based on equation (E8). As shown in FIG. 4, there is a clear dependence of the coefficient χ on rock type. Further, χ for sandstones and shales are approximately equal to 2, while the corresponding value of χ for the tight shales is approximately 1.315.

Figure 4:
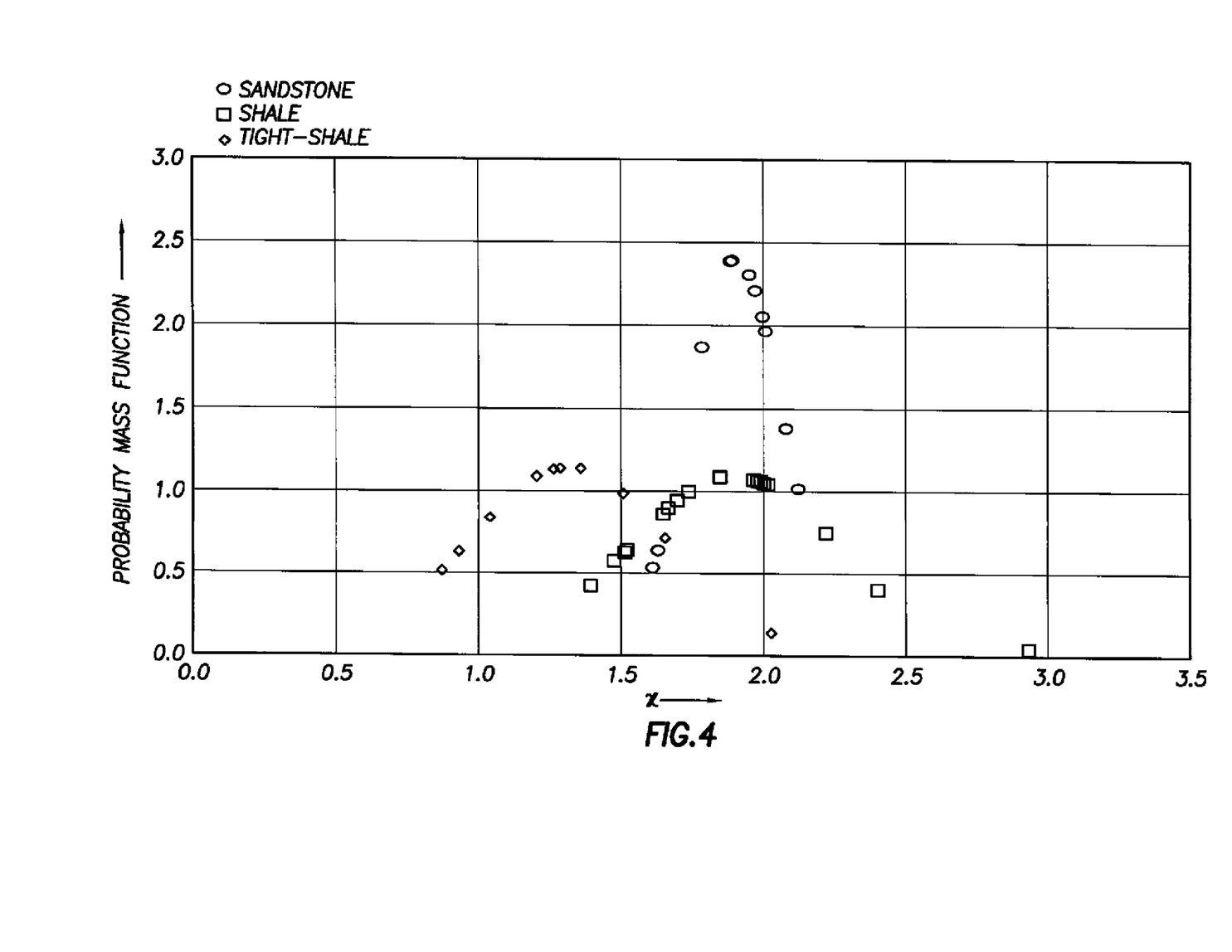
Figure 5:
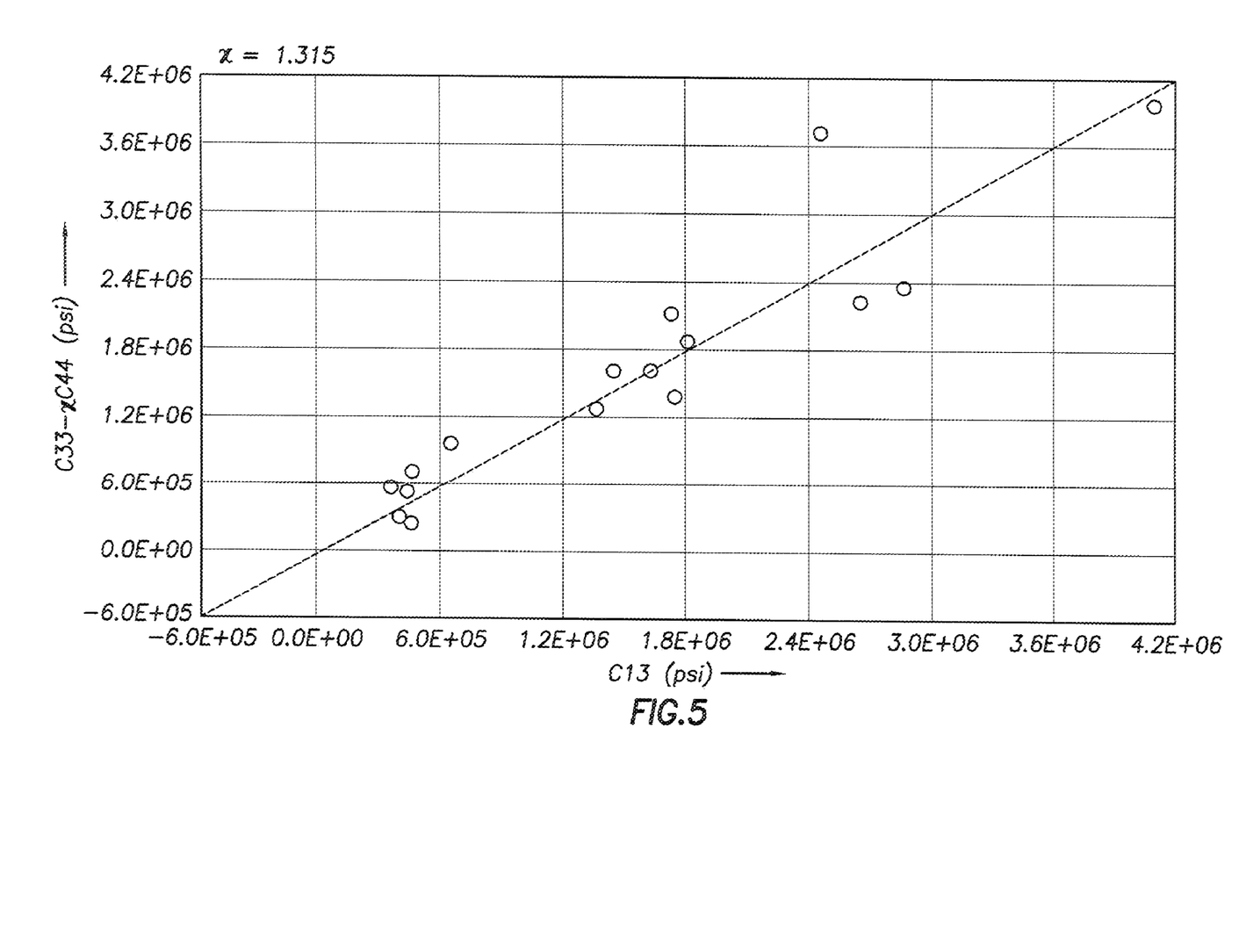

FIG. 5 shows the revised relationship between $C_{13}$ and $C_{33}-\chi C_{44}$ for tight shales using χ=1.315 as shown in FIG. 4. The results in FIG. 5 show a considerable improvement in the equivalence between the measured data and the model as compared to FIG. 3. Though not shown in FIG. 5, those skilled in the art will appreciate that the value of χ may vary based on various characteristics of the formation such as, for example, low porosity, low permeability, high modulus, and high strength. Accordingly, different χ coefficients for predominantly argillaceous, siliceous, phosphatic, and calcareous mudstones may be present in the equations used to determine χ.

Figure 6:
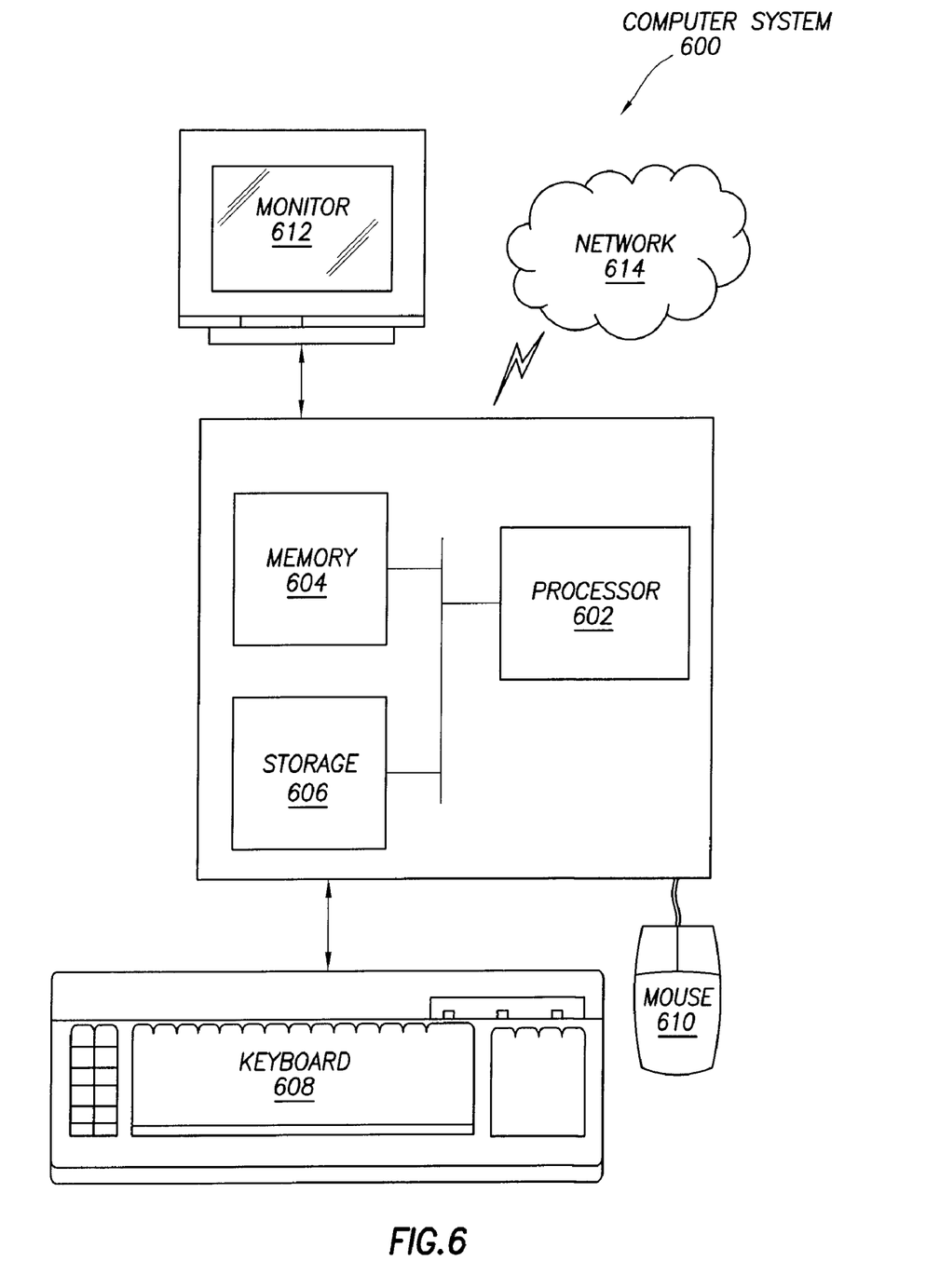
FIG. 6 depicts a computer system in accordance with one or more embodiments.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, or any other computer readable storage device.

It will be understood from the foregoing description that various modifications and changes may be made in the embodiments of estimating horizontal stress from 3D anisotropy without departing from its true spirit.

The aforementioned description is intended for purposes of illustration and should not be construed in a limiting sense. The scope of estimating horizontal stress from 3D anisotropy should be determined by the language of the claims that follow. The term "comprising" within the claims is intended to mean "including at least" such that the recited listing of elements in a claim are an open group. "A," "an" and other singular terms are intended to include the plural forms thereof unless specifically excluded.

While estimating horizontal stress from 3D anisotropy has been described with respect to a limited number of embodiments, those skilled in the art, having benefit of this disclosure, will appreciate that other embodiments can be devised which do not depart from the scope of the disclosure herein.

What is claimed is:

1. A method for determining properties of a subterranean formation, comprising:
   determining at least one characterization parameter based on wave velocity measurement data, wherein the at least one characterization parameter is a variable dependent on a rock type of the subterranean formation;
   measuring a first elastic coefficient of a plurality of elastic coefficients using a sonic measurement tool;
   determining a second elastic coefficient of the plurality of elastic coefficients as a function of at least the first elastic coefficient based on a parameterized approximation equation comprising at least one selected from a group consisting of $C_{13} = (C_{33} - \chi C_{44})$, $C_{11} = \chi'^{*}C_{33}*C_{66}/C_{44} + (1-\chi')^{*}C_{33}$, $C_{12} = \xi C_{13}$ and $C_{13} = \zeta C_{33} - 2C_{44}$, and $$C_{11} = AC_{33}\frac{C_{66}}{C_{44}} + B,$$

wherein the plurality of elastic coefficients comprise $C_{13}$, $C_{33}$, $C_{44}$, and $C_{66}$, and wherein the at least one characterization parameter comprises at least one selected from a group consisting of $\chi$, $\chi'$, $\xi$, $\zeta$, A, and B;
  determining an anisotropic stress profile of the subterranean formations based on a stiffness matrix of the subterranean formation comprising the plurality of elastic coefficients; and
  displaying the anisotropic stress profile of the subterranean formations.

2. The method of claim 1, further comprising:
performing oilfield operations based on the anisotropic stress profile of the subterranean formation.

3. The method of claim 1,
wherein the subterranean formations comprise a transverse isotropic region.

4. The method of claim 3,
wherein the stiffness matrix comprises a fourth-order tensor,
wherein the at least one characterization parameter is determined using statistical analysis of the wave velocity measurement data.

5. The method of claim 4,
wherein $\chi = a_1 * (C_{66} - C_{44}) + a_2$ where $a_1$ and $a_2$ are pre-determined constants.

6. A non-transitory computer readable medium having instructions when executed by a processor comprising functionalities for:
  determining at least one characterization parameter based on wave velocity measurement data, wherein the at least one characterization parameter is a variable dependent on a rock type of the subterranean formation;
  measuring a first elastic coefficient of a plurality of elastic coefficients using a sonic measurement tool;
  determining a second elastic coefficient of the plurality of elastic coefficients as a function of at least the first elastic coefficient based on a parameterized approximation equation comprising at least one selected from a group consisting of $C_{13} = (C_{33} - \chi C_{44})$, $C_{11} = \chi' * C_{33} * C_{66}/C_{44} + (1 - \chi') * C_{33}$, $C_{12} = \xi C_{13}$ and $C_{13} = \zeta C_{33} - 2 C_{44}$, and $$C_{11} = AC_{33}\frac{C_{66}}{C_{44}} + B,$$

wherein the plurality of elastic coefficients comprise $C_{13}$, $C_{33}$, $C_{44}$, and $C_{66}$, and wherein the at least one characterization parameter comprises at least one selected from a group consisting of $\chi$, $\chi'$, $\xi$, $\zeta$, A, and B;
  determining an anisotropic stress profile of the subterranean formations based on a stiffness matrix of the subterranean formation comprising the plurality of elastic coefficients; and
  storing the anisotropic stress profile of the subterranean formations in a repository.

7. The non-transitory computer readable medium of claim 6, the instructions when executed by a processor further comprising functionalities for:
  performing oilfield operations based on the anisotropic stress profile of the subterranean formation.

8. The non-transitory computer readable medium of claim 6,
wherein the subterranean formations comprise a transverse isotropic region.

9. The non-transitory computer readable medium of claim 8,
wherein the stiffness matrix comprises a fourth-order tensor, and
wherein the at least one characterization parameter is determined using statistical analysis of the wave velocity measurement data.

10. The non-transitory computer readable medium of claim 9,
wherein $\chi = a_1 * (C_{66} - C_{44}) + a_2$ where $a_1$ and $a_2$ are pre-determined constants, wherein the plurality of elastic coefficients comprise $C_{66}$.

11. A system for determining properties of a subterranean formation, comprising:
  a processor; and
  a memory having instructions when executed by the processor comprising functionalities for:
    determining at least one characterization parameter based on wave velocity measurement data, wherein the at least one characterization parameter is a variable dependent on a rock type of the subterranean formation;
    measuring a first elastic coefficient of a plurality of elastic coefficients using a sonic measurement tool;
    determining a second elastic coefficient of the plurality of elastic coefficients as a function of at least the first elastic coefficient based on a parameterized approximation equation comprising at least one selected from a group consisting of $C_{13} = (C_{33} - \chi C_{44})$, $C_{11} = \chi' * C_{33} * C_{66}/C_{44} + (1 - 102')* C_{33}$, $C_{12} = \xi C_{13}$ and $C_{13} = \zeta C_{33} - 2 C_{44}$ and $$C_{11} = AC_{33}\frac{C_{66}}{C_{44}} + B,$$

wherein the plurality of elastic coefficients comprise $C_{13}$, $C_{33}$, $C_{44}$, and $C_{66}$, and wherein the at least one characterization parameter comprises at least one selected from a group consisting of $\chi$, $\chi'$, $\xi$, $\zeta$, A, and B;
    determining an anisotropic stress profile of the subterranean formations based on a stiffness matrix of the subterranean formation comprising the plurality of elastic coefficients; and
    displaying the anisotropic stress profile of the subterranean formations.

12. The system of claim 11, the instructions when executed by the processor further comprising functionalities for:
  performing oilfield operations based on the anisotropic stress profile of the subterranean formation.

13. The system of claim 11,
wherein the subterranean formations comprise a transverse isotropic region.

14. The system of claim 13,
wherein the stiffness matrix comprises a $4^{th}$ order tensor, and
wherein the characterization parameter is determined using statistical analysis of the wave velocity measurement data.

* * * * *